(12) United States Patent  (10) Patent No.: US 7,637,830 B2
Greilinger  (45) Date of Patent: Dec. 29, 2009

(54) LOW PROFILE CHAIN AND BELT TENSION ADJUSTER

(76) Inventor: John P. Greilinger, N91 W25390 Tomahawk Dr., Sussex, WI (US) 53089

( * ) Notice: Subject to any disclaimer, the term of this patent is extended or adjusted under 35 U.S.C. 154(b) by 299 days.

(21) Appl. No.: 11/673,712

(22) Filed: Feb. 12, 2007

(65) Prior Publication Data

US 2008/0194364 A1  Aug. 14, 2008

(51) Int. Cl.
 *B62M 9/16*  (2006.01)
(52) U.S. Cl. ............................................. 474/116
(58) Field of Classification Search ............. 474/116; 280/288
 See application file for complete search history.

(56) References Cited

U.S. PATENT DOCUMENTS

| 421,946 | A | * | 2/1890 | Lloyd et al. | 474/116 |
| 484,492 | A | * | 10/1892 | Copeland | 474/116 |
| 501,625 | A | * | 7/1893 | Percy | 474/116 |
| 517,294 | A | * | 3/1894 | Prince | 474/116 |
| 547,523 | A | * | 10/1895 | Perkins | 474/116 |
| 609,062 | A | * | 8/1898 | Webb | 474/116 |
| 614,568 | A | * | 11/1898 | Melanowski | 474/116 |
| 1,001,972 | A | | 8/1911 | McKellar | |
| 1,419,156 | A | * | 6/1922 | Leyner | 474/116 |
| 1,995,794 | A | * | 3/1935 | Clark | 280/286 |
| 2,475,806 | A | * | 7/1949 | Simpson | 474/116 |
| 5,888,159 | A | | 3/1999 | Liao | |
| 6,105,700 | A | * | 8/2000 | Williams et al. | 180/219 |
| 2005/0026731 | A1 | * | 2/2005 | Skidmore et al. | 474/116 |

FOREIGN PATENT DOCUMENTS

| JP | 57-143993 | A | * | 9/1982 |
| JP | 01237286 | A | * | 9/1989 |
| JP | 02028086 | A | * | 1/1990 |
| JP | 04243679 | A | * | 8/1992 |
| JP | 05016870 | A | * | 1/1993 |
| JP | 2003237673 | A | * | 8/2003 |

OTHER PUBLICATIONS

Carlson, Richard F. "Metal Stamping Design". Prentice-Hall, Inc, 1961. pp. ix, 83-84, 192.*

* cited by examiner

*Primary Examiner*—Bradley T King
*Assistant Examiner*—Stephen Bowes
(74) *Attorney, Agent, or Firm*—John K. McCormick

(57) ABSTRACT

A low profile tension adjuster for use with a chain or belt driven power transmission system which has a slidable bar that sits inside of a yoke and over an axle and a base plate and set screw arrangement that abuts the slidable bar. The set screw and base plate being utilized to force the slidable bar into a positive fixed contact with the inside yoke end and then force the base plate and axle rearward in order to tighten the chain or belt power transmission system. The entire tension adjuster being generally cylindrical in shape and not extending beyond the ends of the yoke.

8 Claims, 10 Drawing Sheets

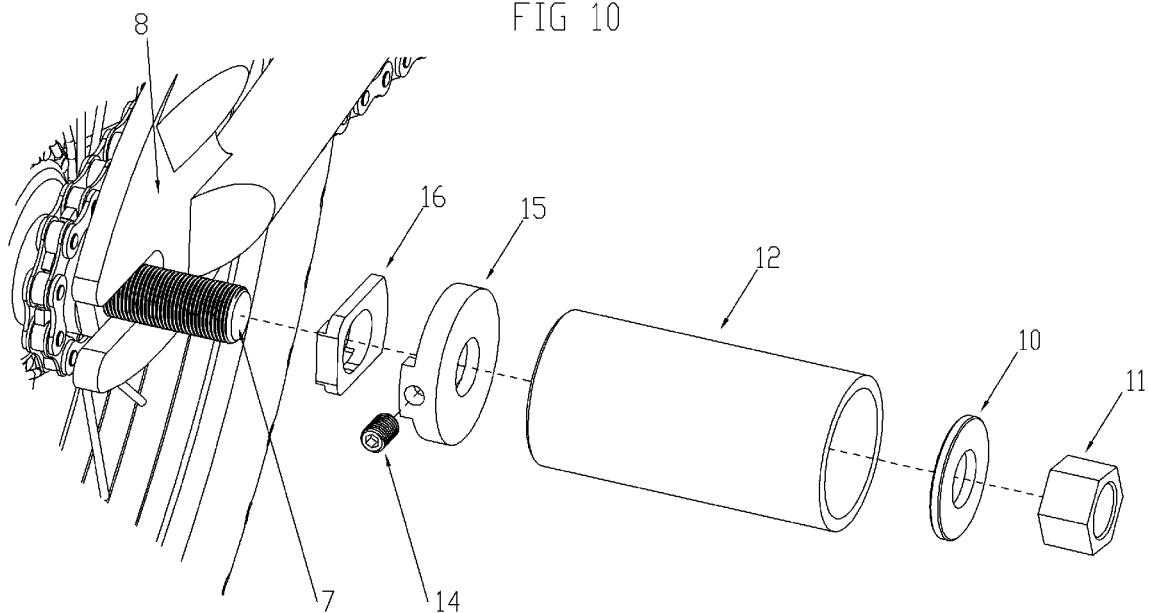

LOW PROFILE CHAIN AND BELT TENSION ADJUSTER

BACKGROUND OF THE INVENTION

1. Field of the Invention

The present invention relates to a tension adjuster and, more specifically to an improved tensioner for the adjustment of tension in a chain or belt of a power transmission mechanism.

2. Description of the Prior Art

Chain and belt driven power transmission mechanisms are utilized in a variety of applications, including, but not limited to, machinery, bicycles, motorcycles, chain saws, lawnmowers and the like. In general, a drive sprocket or pulley is attached to a drive shaft. The drive shaft and drive sprocket or pulley being driven either manually by a user or automatically by a motor of some type. The drive sprocket or pulley is then coupled to a flexible power transmission mechanism such as a chain or belt. The chain or belt is then coupled to a second sprocket or pulley which is attached to a driven shaft. As the drive sprocket or pulley is rotated, either manually or by a motor, the chain or belt turn in relation to the drive sprocket or pulley thereby rotating the driven sprocket or pulley and the connected driven shaft.

Every application of a chain or belt driven power transmission system has its own unique specifications and requirements for chain or belt driven power transmission. One of the more common requirements is that the chain or belt must have the correct tension to efficiently transfer power from the drive sprocket or pulley to the driven sprocket or pulley.

For example, in everyday bicycling, a past time many people enjoy, the means for maintaining the proper tension on the rear axle and driven sprocket of the bicycle are typically simple lock washers and nuts that hold the axle in place on the rear yoke once the proper tension on the chain and sprocket arrangement has been achieved. However, in the sport of BMX bicycling or "extreme bicycling" the participants have specialized bicycles designed to fit their specific needs. In particular, many of the bicycles have what is commonly called "pegs" mounted onto both sides of both of the front and rear wheel axles. FIG. 1 depicts the prior art pegs 12 as they are mounted onto the rear axle of a bicycle. The pegs 12 extend outward from the wheel axle about 4 or 5 inches. There are many uses for these pegs in extreme bicycling however, one of the more common uses is to ride the bicycle up and off of a curved surface or ramp and then use one side of the rear pegs 12 to "ride" the bicycle along a railing.

While this stunt and other similar ones are both tricky and impressive, there are some drawbacks to the bicycle in doing these stunts, as will be explained below. As is well known in the construction of bicycles, there is generally a split open-ended "yoke" 8 into which the axles of the wheel and tire sits. On the rear axle there is a chain driven sprocket attached to the rear wheel axle. This driven sprocket is rotatably attached to the bicycle chain for providing momentum to the bicycle and rider through a chain drive sprocket and pedal arrangement located beneath the rider. Of necessity, the rear wheel and driven sprocket, the chain and the drive sprocket and pedal arrangement need to be kept in a relatively tight arrangement in order to keep a proper amount of tension on the chain to provide maximum power transfer and to prevent the chain from disengaging from either sprocket which could otherwise cause accidents and/or injury.

In the performance of the BMX moves as described above, the weight and force of the rider and bicycle landing on a peg 12 and riding along a rail for a short distance can cause the rear axle and driven sprocket arrangement to be forced inward on the yoke 8, thereby causing tension in the chain 9 to be reduced and/or lost entirely. To solve this problem of loosening chains, there are a number of chain tensioners currently available on the market.

FIGS. 2 and 3 depict a conventional prior art bicycle chain tension adjuster 1 which is a longitudinal plate 2 having a hole 3 defined laterally therethrough and a threaded rod 4 fixedly attached to the plate 2. A slidable retaining bar 5 fits over the threaded rod 4 and a lock nut 6 is threaded onto the threaded rod 4. As shown in FIG. 3, the hole 2 in the chain tensioner 1 is placed over the axle 7. The axle 7 is placed in the bicycle yoke 8 in this example. The retaining bar 5 fits over the open end of the yoke 8. As the lock nut 6 is turned in, the lock nut 6 pushes the retaining bar 5 into contact with the ends of the yoke 8 thereby pulling the plate 2 and axle 7 backwards to tighten the chain 9. Once the proper tension has been achieved, the position of the tensioner 1 and axle 7 are held in place by a washer 10 and nut 11.

Unfortunately, all of the tensioners found by the inventor suffer from the same problem. The problem being that the current chain tensioners 1 have a threaded rod 4 or other protrusion extending out past the rear of the yoke 8. When performing the extreme bicycling maneuver described above, (i.e.; riding the bicycle on a peg 12 on a rail), when executing and landing this maneuver, it often happens that the threaded tensioning rod 4 and retaining bar 5 strike the rail instead of just the peg 12 because the retaining bar 5 and rod 4 or other protrusion stick out past the end of the yoke 8. This can result in loosening the chain tension thereby causing the bicycle to operate improperly or not at all. In addition, the above stated maneuver sometimes damages and/or destroys the tensioner by breaking the threaded rod off thereby losing tension to the chain and sprocket arrangement. This can prevent the cyclist from riding the rail successfully, resulting in injury to the rider and further damage to the bicycle if the bicycle and rider fall off the rail to the hard ground from a reasonably high height and speed in the air.

Other applications where a low profile chain or belt tensioner would be advantageous could be in motorcycles, lawnmowers, machinery, chain saws and the like.

The present invention provides a low profile chain and belt tensioner to mitigate or obviate the aforementioned problems.

SUMMARY OF THE INVENTION

The present invention provides a low profile tension adjuster and comprises a slidable bar, a base plate and a set screw. The slidable bar has one surface shaped to fit the inside curve of an open ended yoke and has a slot for accepting an axle therethrough. The other side of the slidable bar is shaped to fit into a recessed slot formed into the base plate. The base plate is cylindrical in shape with a hole for receiving the axle therethrough and has a threaded hole in one end for receiving the set screw. When the set screw is turned into the base plate, the set screw makes contact with the slidable bar and pushes the slidable bar into the inside curve of the open ended yoke. Once the slidable bar has made contact with the inside curve of the yoke, any further turning in of the set screw causes the base plate to move backward pulling the axle with it, thereby tightening the chain or belt. The height of the slidable bar that fits into the base plate being slightly taller than the base plate thereby causing the slidable bar to tighten onto the yoke sides prior to the base plate tightening down when a washer and nut are screwed onto the axle to hold the axle in position relative to the yoke.

It is an object of the invention to provide a tension adjuster that does not extend beyond the open ends of the yoke it is attached to.

It is another object of this invention to provide a tension adjuster that operates against the inside of the yoke surface rather than the yoke ends.

It is another object of this invention to provide a tension adjuster that readily accepts a peg.

It is another object of this invention to provide a means for securing the slidable bar relative to the yoke prior to securing the base plate of the tension adjuster.

Other objects, advantages and novel features of the invention will become more apparent from the following detailed description when taken in conjunction with the accompanying drawings

BRIEF DESCRIPTION OF THE DRAWINGS

For a fuller understanding of the nature and objects of the invention, reference should be had to the following detailed description taken in conjunction with the accompanying drawings in which:

FIG. 10 is an exploded view of FIG. 9.

DETAILED DESCRIPTION OF THE PREFERRED EMBODIMENTS

For explanation purposes only, the use of a bicycle chain transmission system will be employed in order aid in the comprehension of this invention. The use of this example is not meant to limit the scope of the background or of the invention to bicycles, but rather to aid in the understanding of the invention.

Figure 1:
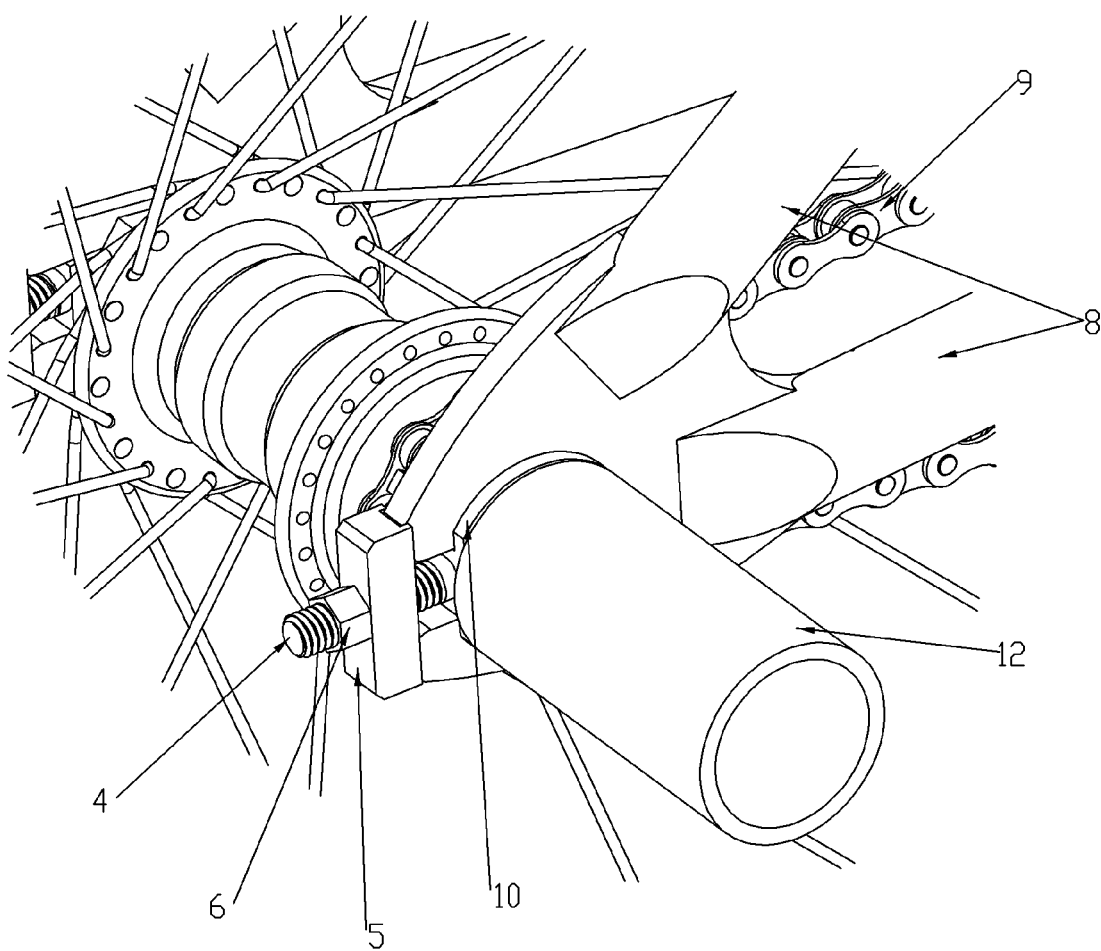
FIG. 1 depicts a perspective view of a prior art chain tensioner and peg mounted to a bicycle.
Figure 2:
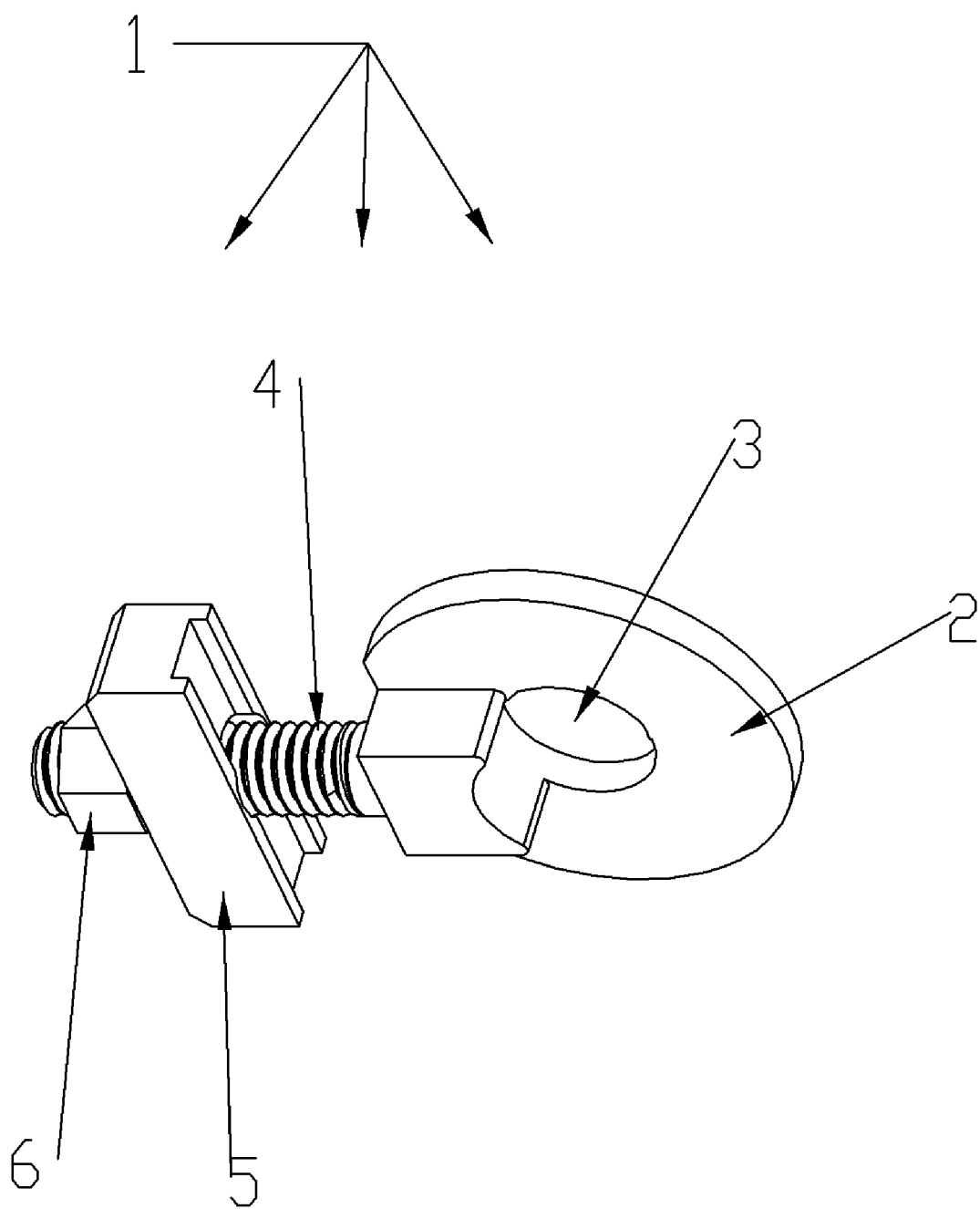
FIG. 2 depicts a perspective view of the prior art chain tensioner.
Figure 3:
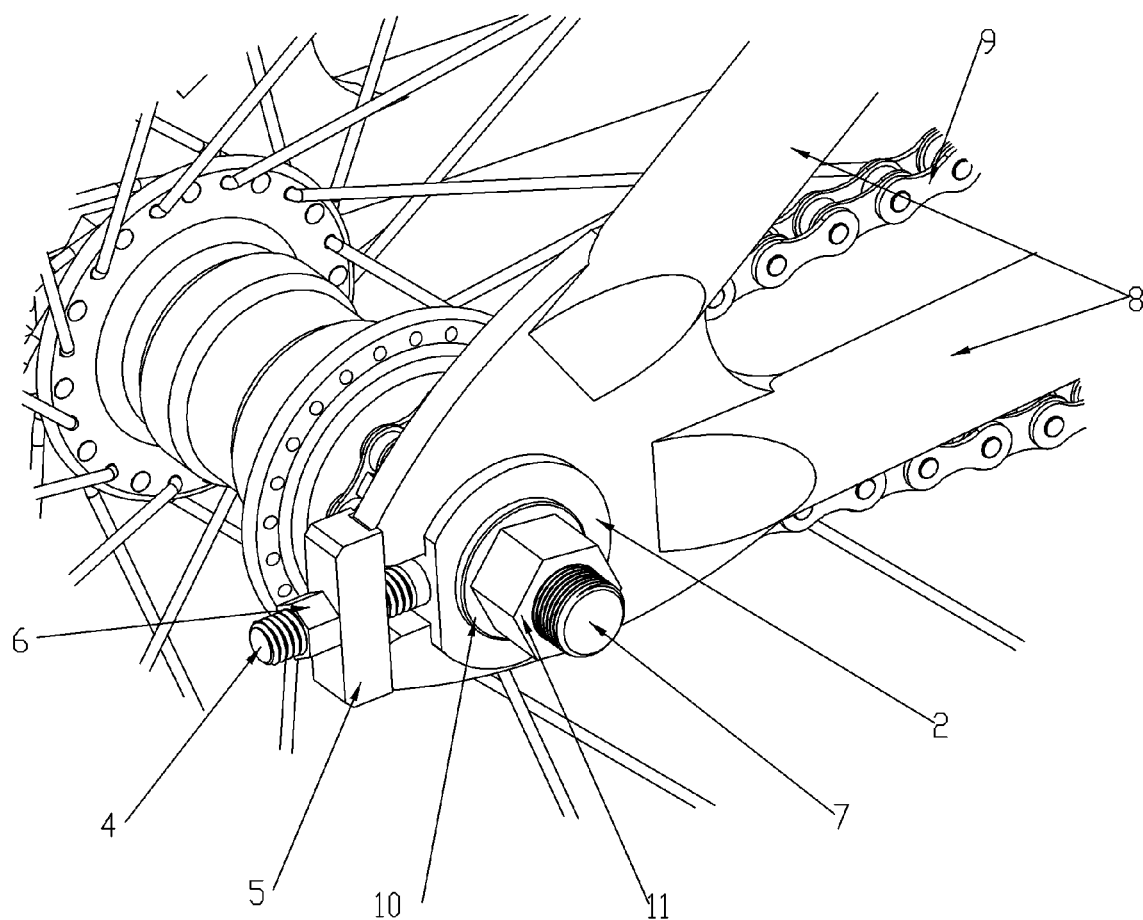
FIG. 3 depicts a perspective view of the prior art chain tension mounted to a bicycle.
Figure 4:
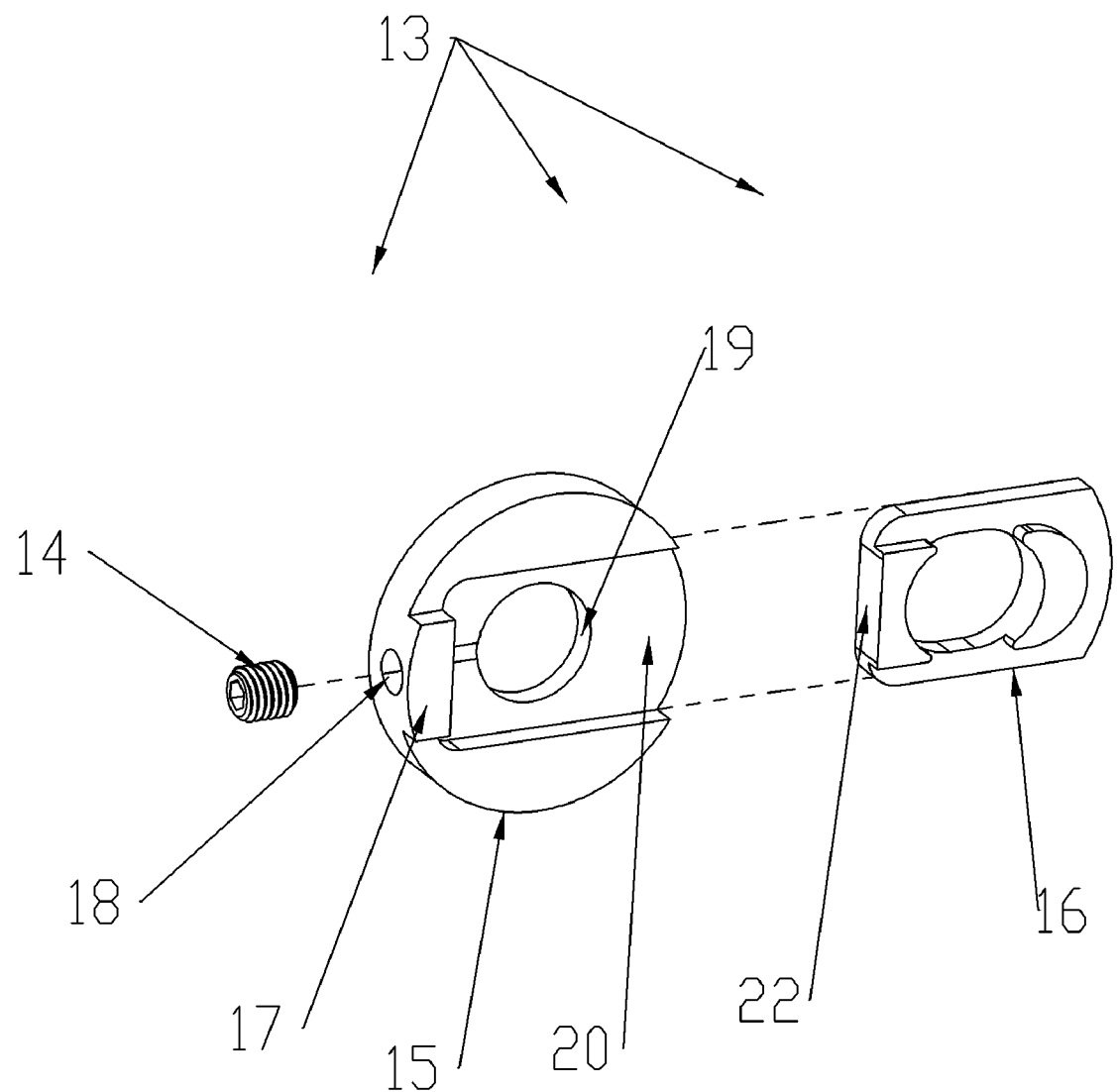
FIG. 4 depicts an exploded perspective view of the tension adjuster of the present invention.

FIG. 4 is an exploded view of the tension adjuster 13 of the present invention. The tension adjuster 13 consists of a set screw 14, a base plate 15 and a slidable bar 16. The base plate 15 has one raised end 17 through which there is a threaded hole 18. The set screw 14 is treaded into the threaded hole 18 when in use. The base plate 15 has an axle hole 19 for accepting the axle and a recessed slot 20 for accepting the slidable bar 16.

Figure 5:
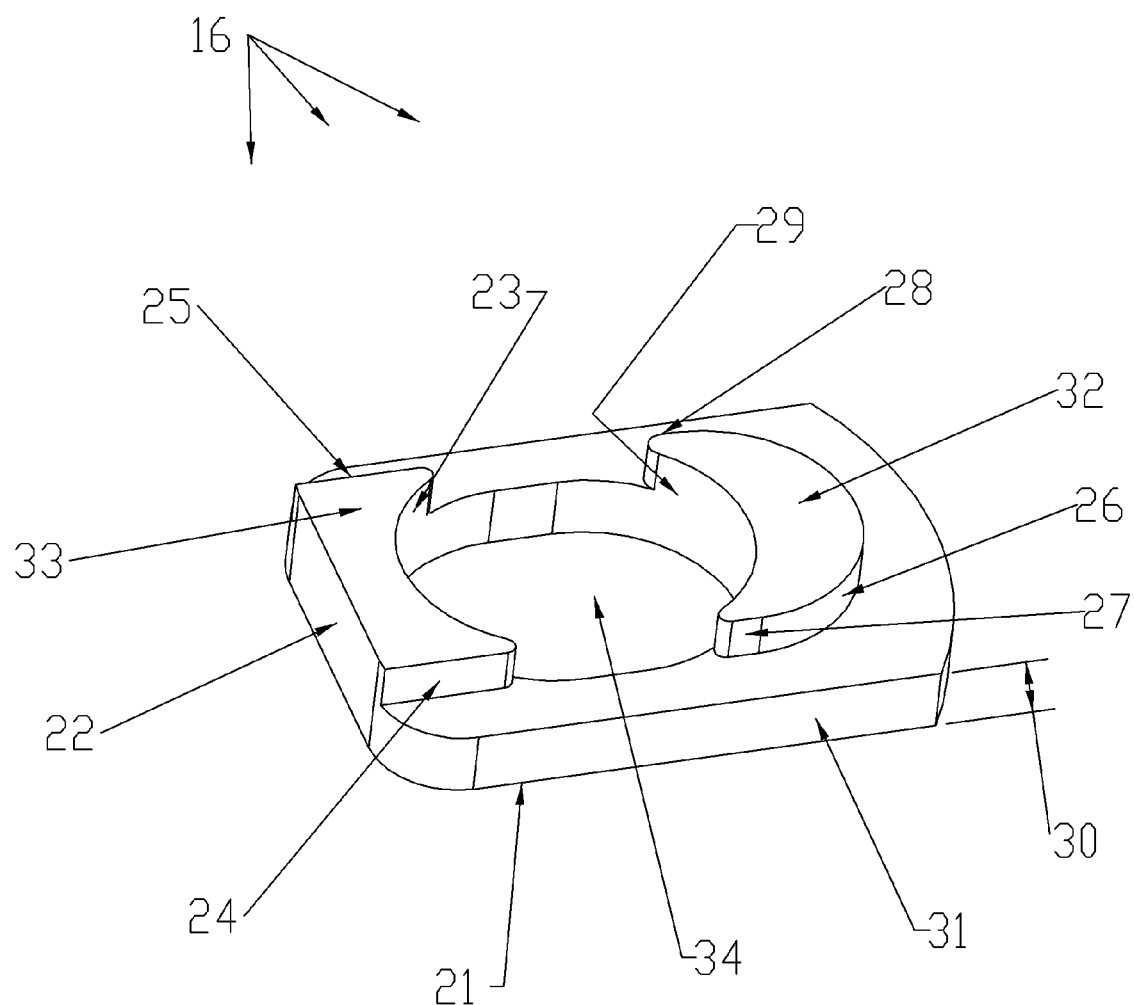
FIG. 5 depicts a perspective view of the slidable bar of the present invention.

FIG. 5 depicts the slidable bar 16. The slidable bar 16 has a longitudinal bottom surface 21 which slides on the recessed slot 20 in the base plate 15 (shown in FIG. 4). The thickness 30 of the base 31 of the slidable bar 16 is slightly larger than the depth of the depth of the recessed slot 20 (shown in FIG. 4) such that when the tensioner adjuster 13 is assembled on a machine, bicycle or the like, with a fastening mechanism, such as a nut 11, the slidable bar 16 engages before the base plate 15 to secure the location of the slidable bar 16 to the side of the yoke 8 first (shown in FIG. 6).

The slidable bar 16 has front and rear laterally raised protrusions 32 and 33. The rear protrusion 33 has a vertical flat rear surface 22, two vertical side surfaces 24 and 25, and a vertical inside curved surface 23. The flat rear surface 22 is in contact with the set screw 14 (shown in FIG. 4) when the tension adjuster 13 is assembled. When the set screw 14 is turned in or out of the base plate 15, the base plate 15 moves in a longitudinal direction relative to the slidable bar 16. The front protrusion 32 has a vertical curved front surface 26, two vertical side surfaces 27 and 28 and a vertical inside curved surface 29. There is a through-hole slot 34 in the base 31 of the slidable bar 16 to accommodate the axle or drive shaft (shown in FIG. 6).

Figure 6:
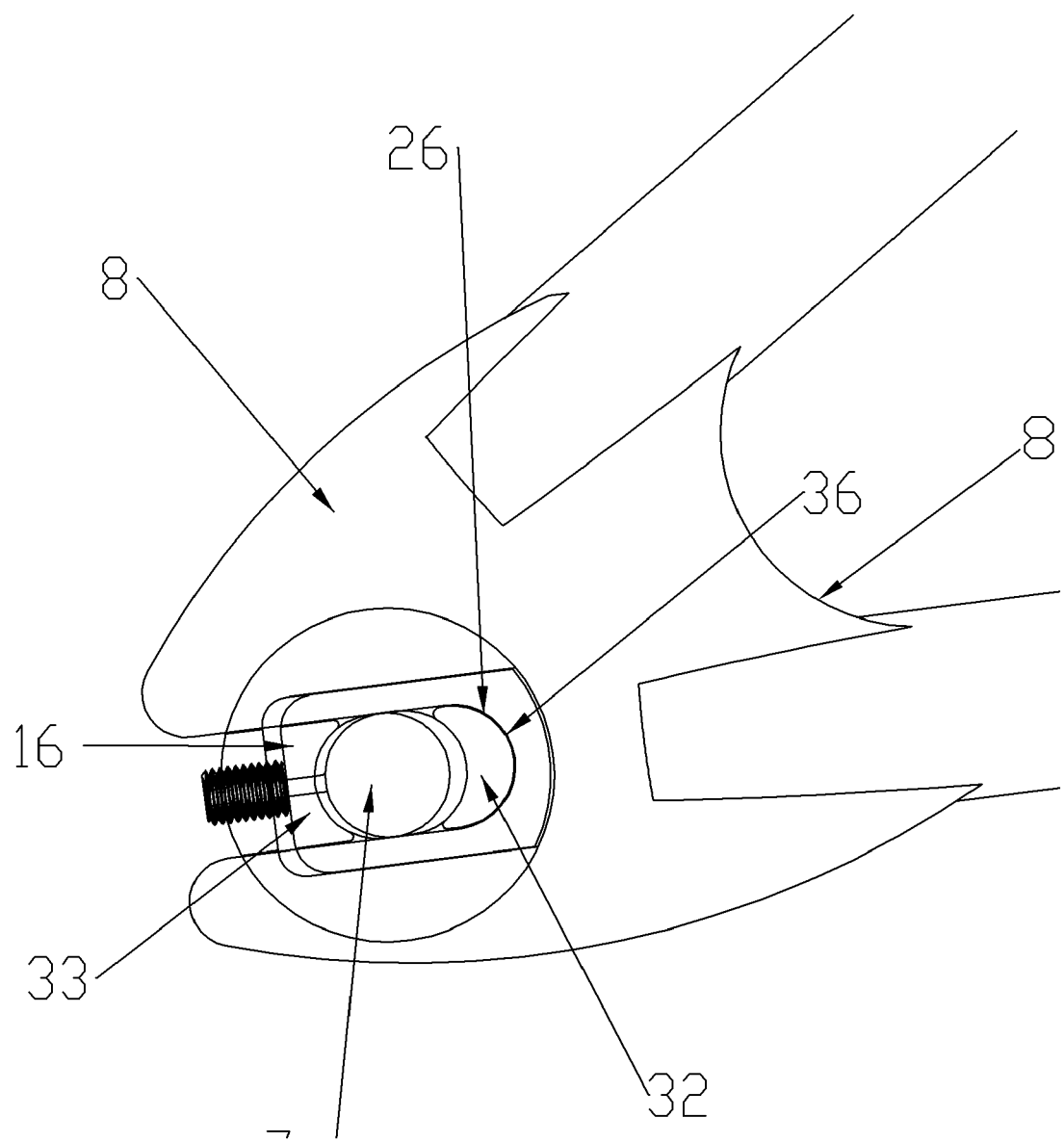
FIG. 6 depicts an inside planar view of a yoke with the present invention installed in the yoke.

As shown from an inside view of the yoke 8 in FIG. 6, the slidable bar 16 fits inside of a yoke 8 of a machine, bicycle or the like with the curved front surface 26 of the front protrusion 32 abutting the inside front surface 36 of the yoke 8. An axle or drive shaft (not shown) would extend through the slot 34 and the yoke 8.

Figure 7:
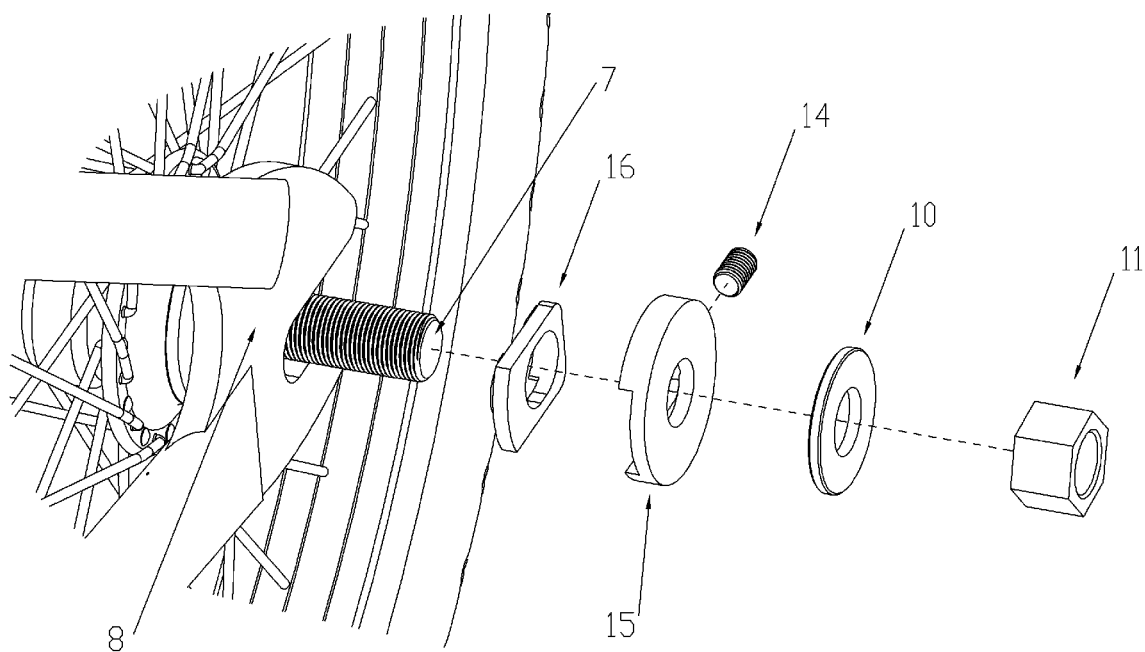
FIG. 7 is an exploded perspective view of the present invention and the rear yoke and axle of a bicycle.

FIG. 7 depicts an exploded view of the tension adjuster 13 on a bicycle rear wheel. The wheel axle 7 fits into the yoke 8. The slidable bar 16 fits partially into the yoke 8 and over the axle 7. The base plate 15 fits over the slidable bar 16 with the set screw 14 being screwed into the base plate 15 to tighten the axle 7 and chain (not shown). A washer 10 is then placed over the axle 7 and nut 11 is then used to secure the tension adjuster 13, axle 7 and yoke 8 in relative position to each other.

Figure 8:
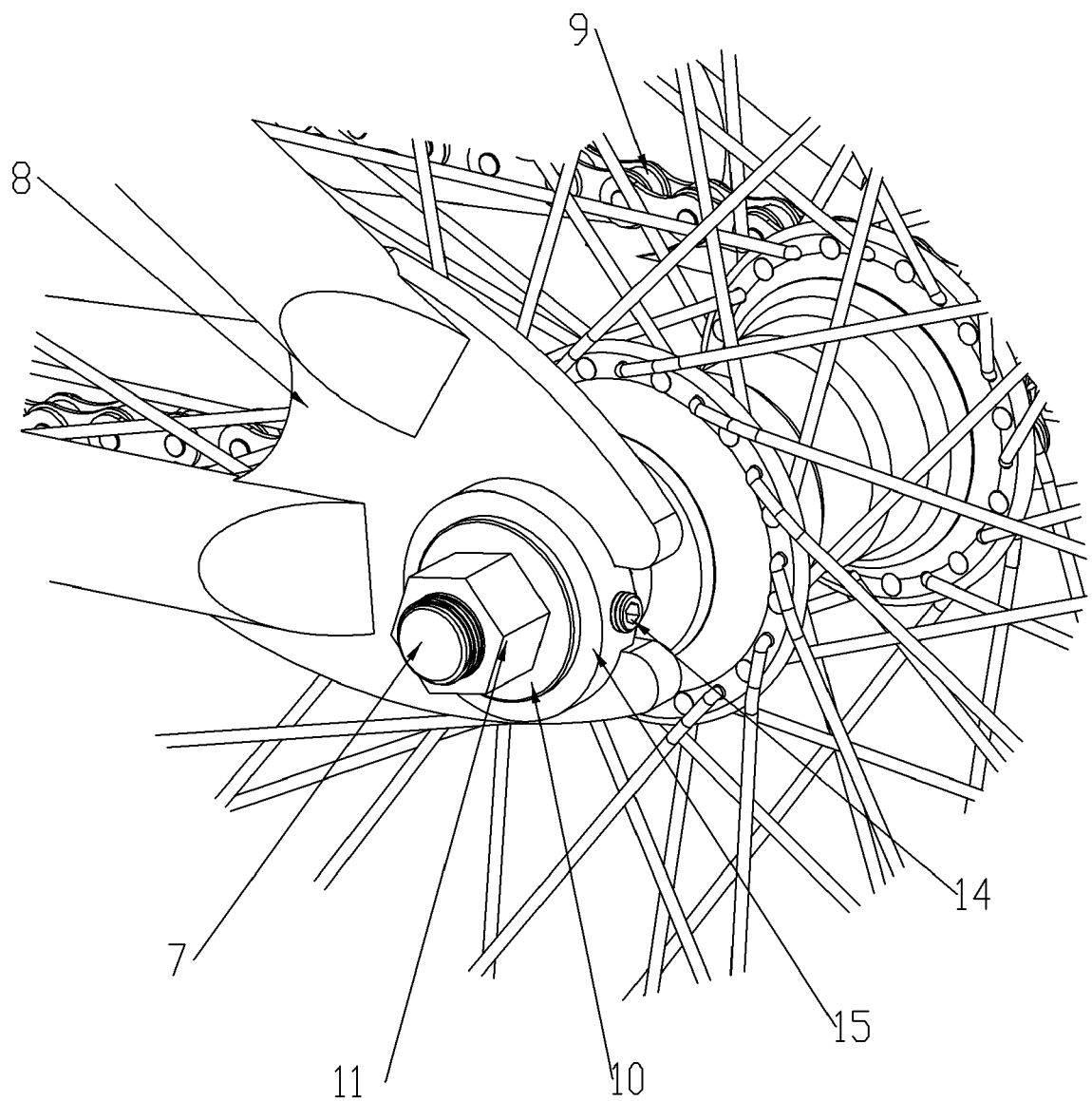
FIG. 8 is a perspective view of the present invention as assembled on a rear bicycle yoke and axle.

FIG. 8 depicts the tension adjuster 13 assembled onto a bicycle with the slidable bar (not shown) hidden beneath the base plate 15. An axle or drive shaft 7 passes through the yoke 8, the slidable bar 16 (shown in FIG. 6) and the base plate 15. As the set screw 14 is turned in, the slidable bar 16 (shown in FIG. 6) is pushed forward until the curved front surface 26 of the slidable bar 16 contacts the inside surface 36 of the yoke 8 (shown in FIG. 6). As the set screw 14 is turned in further, the slidable bar 16 (shown in FIG. 6) stops moving and the base plate 15 moves rearward pulling the axle 7 and chain 9 backward causing the chain 9 to tighten. Once the proper tension is achieved, the nut 11 is tightened down over the washer 10 and yoke 8 thereby locking the axle 7 in place.

Figure 9:
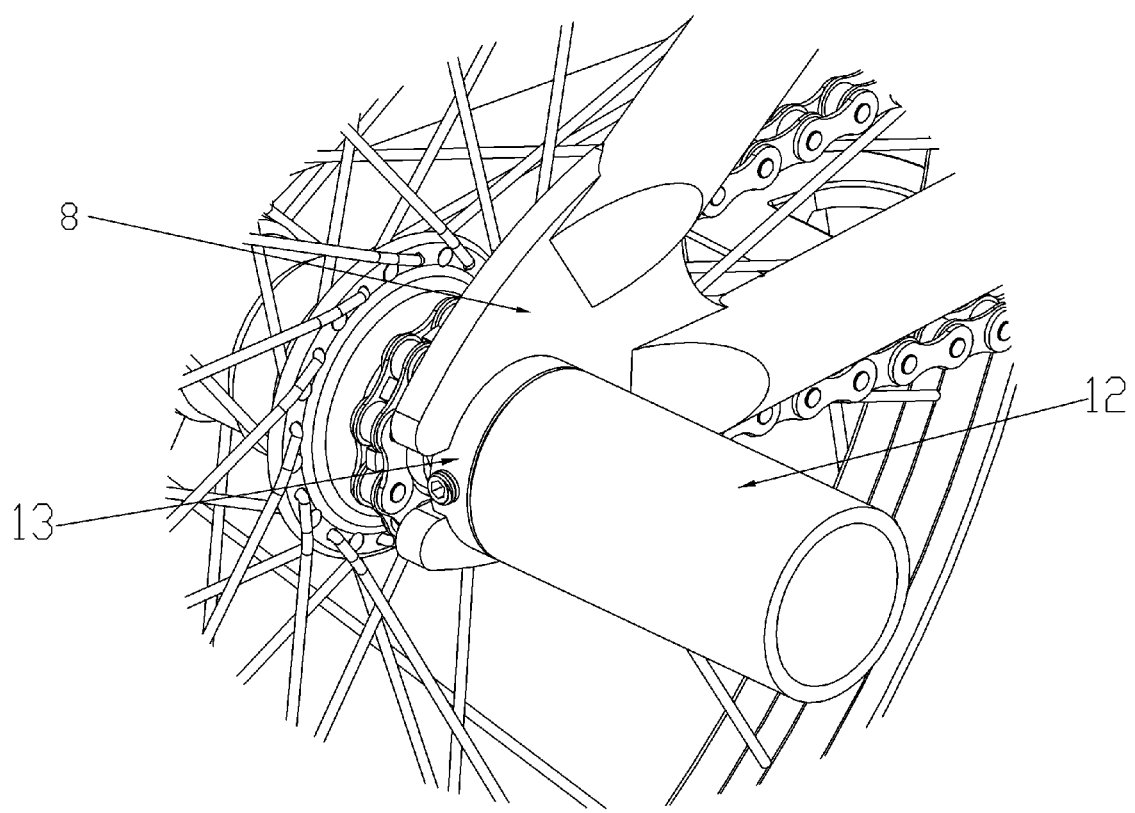
FIG. 9 is a perspective view of the present invention as assemble on a rear bicycle yoke and axle including a peg.

FIG. 9 depicts the tension adjuster 13 secured to a bicycle yoke 8 with a peg 12 attached to the axle (not shown). FIG. 10 depicts an exploded view of the bicycle yoke 8, the axle 7, the slidable bar 16, the base plate 15, the set screw 14, the peg 12, the washer 10 and the nut 11.

As can be readily seen from the present invention in FIGS. 6, 8 and 9 there are no parts or components of the tension adjuster protruding beyond the ends of the yoke 8 that can be damaged or broken off when in use.

While this invention has been particularly shown and described with references to chain driven mechanisms, it will be understood by those skilled in the art that various changes in form and details may be made without departing from the spirit and scope of the invention and, in particular, to the use of the invention in belt driven mechanisms.

I claim:

1. A tension adjusting apparatus for a flexible power transmission means, said tension adjusting apparatus comprising:
   a set screw;
   a base plate being a first vertical plate having a first side and a second side,
   a through hole going through said first and second side of said base plate for accepting an axle, said first side of said base plate having a first raised protrusion with a threaded through hole in said first raised protrusion for accepting said set screw and a recessed slot for accepting a slidable bar;

said slidable bar being a second vertical plate having a first and second side, an elongated through hole slot going through said first and second side of said slidable bar for accepting said axle, said first side of said slidable bar having second and third raised protrusions, said second raised protrusion utilized for contacting an inside surface of a yoke and said third raised protrusion for contacting with the end of said set screw located in said base plate, said second side of said slidable bar slideably received in said recessed slot in said base plate; wherein when the set screw is turned into the base plate, the set screw makes contact with the slidable bar and pushes the slidable bar into the inside curved surface of the open ended yoke, and once the slidable bar has made contact with an inside curved surface of the yoke, any further turning in of the set screw causes the base plate to move backward pulling the axle with it, thereby tightening the flexible power transmission means.

2. The tension adjusting apparatus of claim 1 wherein the distance between said first and said second side of said slidable bar is thicker than said recessed slot in side one of said base plate.

3. The tension adjusting apparatus of claim 1 wherein said base plate and said slidable bar do not extend past the ends of said yoke.

4. The tension adjusting apparatus of claim 1 wherein the flexible power transmission means consists of a chain engaged with the teeth of a sprocket coupled to a driven axle.

5. A method for adjusting tension of a flexible power transmission means that transfers power from a drive axle to a driven axle held in a yoke, said method comprising the steps of:

providing a tension adjusting device, said tension adjusting device comprising:

a slidable bar having a first and second side and a first and second protrusion on said first side of said slidable bar and an elongated slotted hole between said first and second protrusion for accepting said driven axle, a base plate having a first side with a recessed slot for receiving said second side of said slidable bar, a hole for receiving said driven axle and a third protrusion with a threaded through hole for accepting a set screw, attaching a flexible power transmission means to said drive axle and said driven axle, installing said set screw into said threaded hole in said base plate, placing said slidable bar onto said driven axle through said elongated slotted hole in said slidable bar, placing said slidable bar and said driven axle into said yoke with said first protrusion on said first side of said slidable bar abutting the inside curved surface of said yoke, placing said hole in said base plate over said driven axle and placing said recessed slot in said base plate over said second side of said slidable bar, placing a washer over said driven axle and said base plate, threading on a nut over said driven axle in order loosely hold said tension adjuster in place, screwing in said set screw in said base plate until said set screw pushes on said second protrusion on said slidable bar which in turn pushes said first protrusion on said slidable bar into a fixed position on said inside curved surface of said yoke wherein further screwing in of said screw causes said base plate to move backwards in said yoke drawing said driven axle and said flexible power transmission means in tension with said drive axle, and tightening down said nut to hold said tension adjusting device and said axle in place.

6. The method of claim 5 wherein the distance between said first and said second side of said slidable bar is thicker than said recessed slot in side one of said base plate.

7. The method of claim 5 wherein said base plate and said slidable bar do not extend past the ends of said yoke.

8. The method of claim 5 wherein the flexible power transmission means consists of a chain engaged with the teeth of a sprocket coupled to a driven axle.

* * * * *